/ 1/1854 (2013.01); H04L 69/16 (2013.01); H04L 69/28 (2013.01); H04L 47/29 (2013.01)

(12) United States Patent
Liang

(10) Patent No.: US 9,736,885 B2
(45) Date of Patent: Aug. 15, 2017

(54) TERMINAL DEVICE AND PACKET PROCESSING METHOD

(71) Applicants: AMBIT MICROSYSTEMS (SHANGHAI) LTD., Shanghai (CN); HON HAI PRECISION INDUSTRY CO., LTD., New Taipei (TW)

(72) Inventor: Yuan-Tao Liang, New Taipei (TW)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 120 days.

(21) Appl. No.: 14/862,615

(22) Filed: Sep. 23, 2015

(65) Prior Publication Data
US 2016/0099793 A1    Apr. 7, 2016

(30) Foreign Application Priority Data

Oct. 7, 2014    (TW) .............................. 103134948 A

(51) Int. Cl.
| | |
|---|---|
| H04L 1/00 | (2006.01) |
| H04W 88/02 | (2009.01) |
| H04L 1/16 | (2006.01) |
| H04L 1/18 | (2006.01) |
| H04L 29/06 | (2006.01) |
| H04L 12/801 | (2013.01) |

(52) U.S. Cl.
CPC .......... H04W 88/02 (2013.01); H04L 1/0007 (2013.01); H04L 1/1628 (2013.01); H04L

(58) Field of Classification Search
CPC ...................................................... H04L 1/0007
USPC ....................................................... 370/328
See application file for complete search history.

(56) References Cited

U.S. PATENT DOCUMENTS

| | | | |
|---|---|---|---|
| 7,839,876 B1 | 11/2010 | Goel et al. | |
| 2007/0260745 A1 | 11/2007 | Moutarlier | |
| 2009/0290598 A1 | 11/2009 | Pani et al. | |
| 2013/0223337 A1 | 8/2013 | Choo | |
| 2014/0112322 A1 | 4/2014 | Ram et al. | |

FOREIGN PATENT DOCUMENTS

TW        201427357 A      7/2014

*Primary Examiner* — Shaq Taha
*Assistant Examiner* — Pamit Kaur
(74) *Attorney, Agent, or Firm* — Steven Reiss

(57) ABSTRACT

A packet processing method, the method includes, receiving TCP packets from a wireless access point. An A-MSDU packet is created by aggregating TCP ACK frames generated by the received TCP packets. When the current data transmission speed is less than or equal to a first threshold value and timeout for the A-MSDU packet sent to the wireless access point continuously occurs over a first predefined time, a transmission time interval is reduced by the first preset value and the packet size value is re-calculated according to the adjusted transmission time interval. When the current data transmission speed is greater than or equal to the second threshold value and the size of the created A-MSDU packet that achieves the packet size value occurs over a second predefined time, the packet size value is increased by the second preset value.

10 Claims, 2 Drawing Sheets

TERMINAL DEVICE AND PACKET PROCESSING METHOD

CROSS-REFERENCE TO RELATED APPLICATIONS

This application claims priority to Taiwanese Patent Application No. 103134948 filed on Oct. 7, 2014, the contents of which are incorporated by reference herein.

FIELD

The present disclosure generally relates to data packet processing

BACKGROUND

Aggregate-MAC Service Data Unit (A-MSDU) technology is to aggregate multiple MSDU into a larger load in a certain way. Currently, a transmission time interval and a packet size value of the A-MSDU packet are fixed.

BRIEF DESCRIPTION OF THE DRAWINGS

Implementations of the present technology will now be described, by way of example only, with reference to the attached figures.

DETAILED DESCRIPTION

Figure 1:
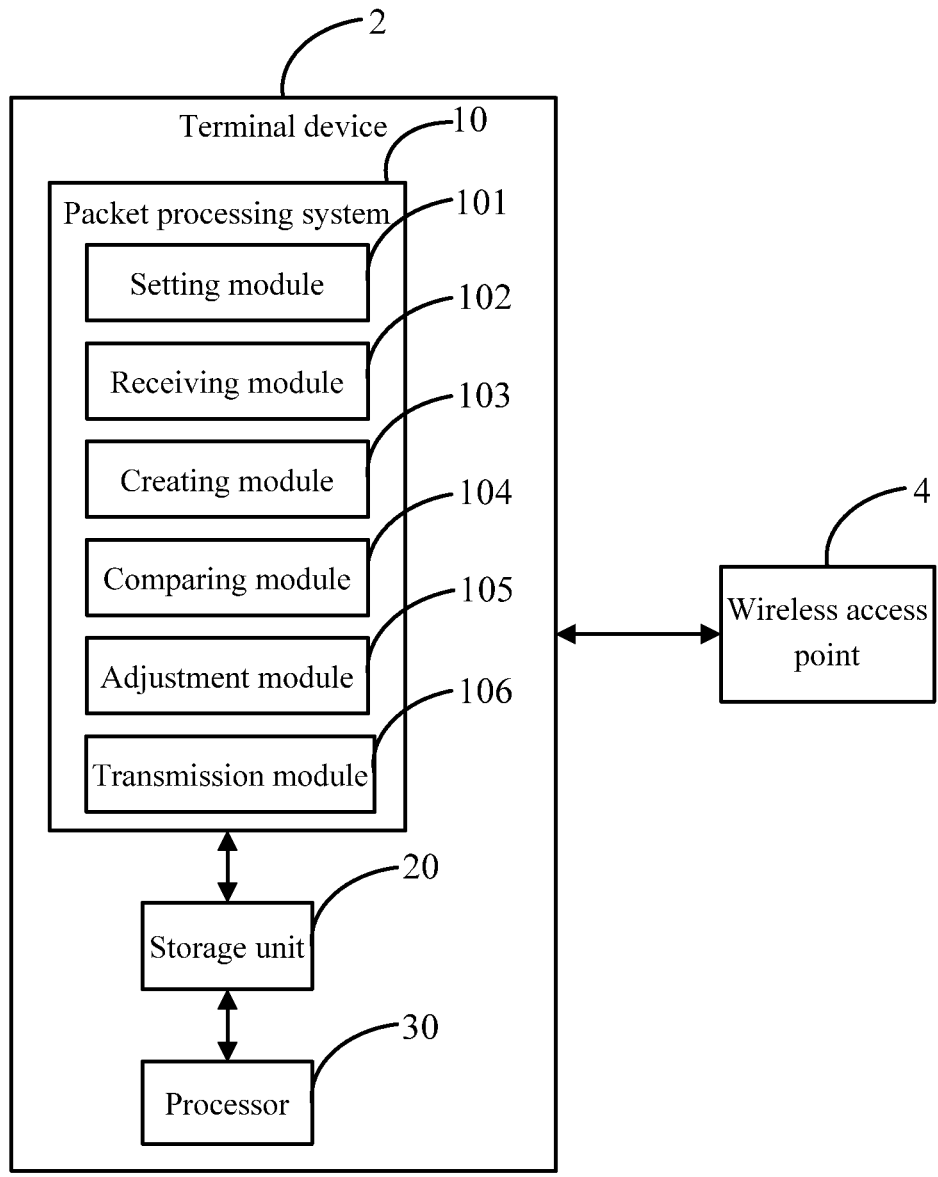
FIG. 1 illustrates a block diagram of an embodiment of a terminal device in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates a block diagram of an embodiment of a terminal device 2 in accordance with the present disclosure. In the illustrated embodiment, the terminal device 2 includes a packet processing system 10, a storage unit 20 and a processor 30. The terminal device 2 may be a computer equipped with a wireless network card or a Wi-Fi enabled smart phone. The terminal device 2 wirelessly connects to a wireless access point 4 and then accesses a wireless local area network through the wireless access point 4.

The packet processing system 10 adjusts a transmission time interval and a packet size value an A-MSDU packet according to the current network loading which refers to the data transmission speed. Thus, the terminal device 2 can deliver A-MSDU packets to the wireless access point 4 with acceptable data through-put and timeout under different network loadings.

In one embodiment, the packet processing system 10 includes a setting module 101, a receiving module 102, a creating module 103, a comparing module 104, a adjustment module 105, and a transmission module 106. One or more of the function modules include computerized codes in the form of one or more programs that are stored in the storage unit 20 and executed by the processor 30 to provide functions of the packet processing system 10. The storage unit 20 can be a dedicated memory, such as an EPROM or a flash memory. Descriptions of the functions of the modules 101-106 are given with reference to FIG. 2.

Figure 2:
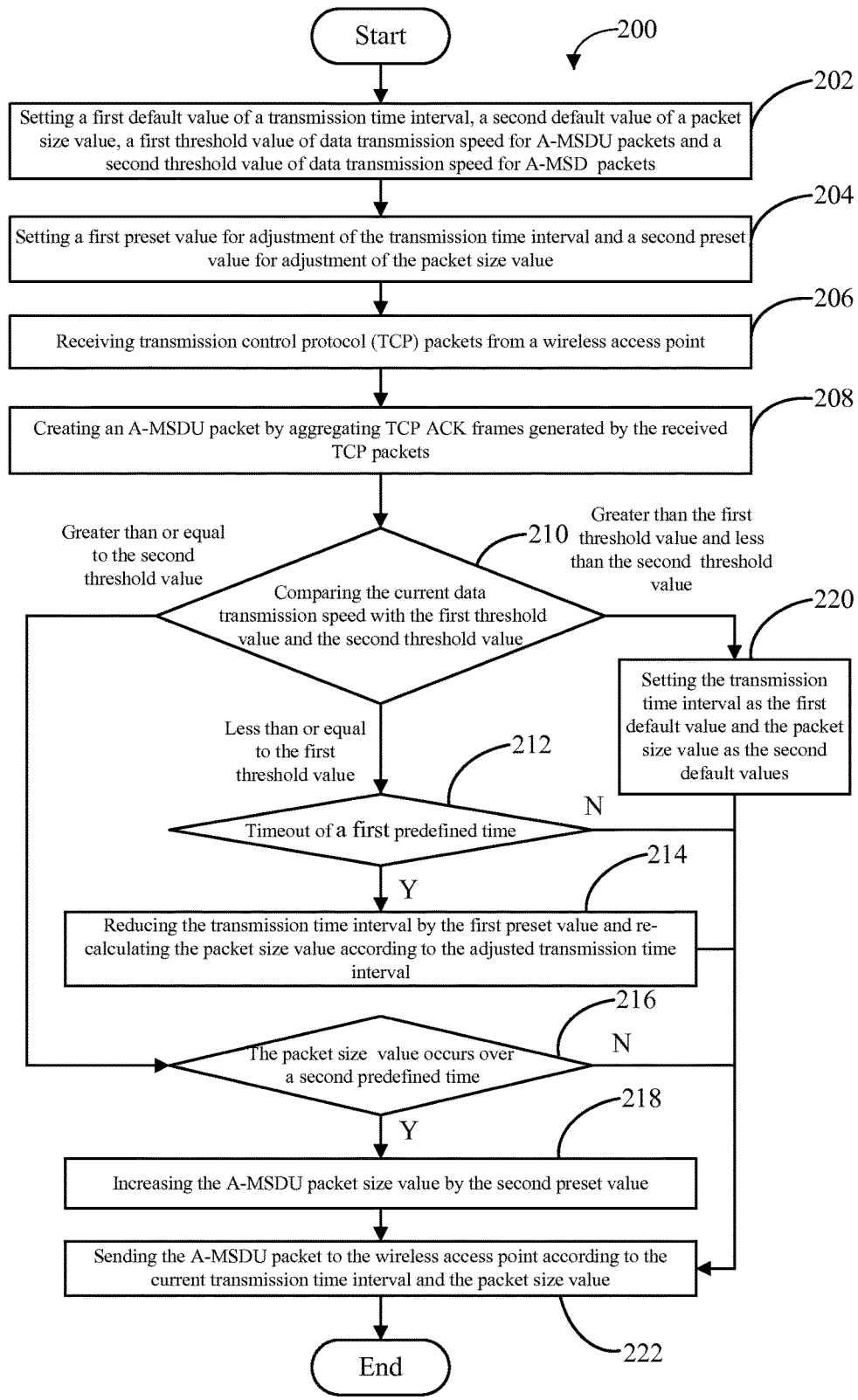
FIG. 2 illustrates a flowchart of an embodiment of a packet processing method in accordance with the present disclosure.

FIG. 2 presents a flowchart in accordance with an embodiment of a packet processing method 200. The processing method 200 is provided by way of example, as there are a variety of ways to carry out the method. The method 200 described below can be carried out using the configurations illustrated in FIG. 1, for example, and various elements of these figures are referenced in explaining the processing method 200. Each block shown in FIG. 2 represents one or more processes, methods, or subroutines, carried out in the exemplary processing method 200. Additionally, the illustrated order of blocks is by example only and the order of the blocks can change. The processing method 200 can begin at block 202.

At block 202, the setting module 101 sets a first default value of a transmission time interval, a second default value of a packet size value, and a first threshold value of data transmission speed for A-MSDU packets and a second threshold value of data transmission speed for A-MSDU packets. The first threshold value is less than the second threshold value. In one embodiment, the first threshold value is 5 megabits per second (Mbps), while the second threshold value is 40 Mbps. The setting module 101 stores the described values in the storage unit 20.

At block 204, also the setting module 101 sets a first preset value for adjustment of the transmission time interval and a second preset value for adjustment of the packet size value.

At block 206, the receiving module 102 receives transmission control protocol (TCP) packets from the wireless access point 4.

At block 208, the creating module 103 creates an A-MSDU packet by aggregating TCP acknowledgement character (ACK) frames generated by the received TCP packets. In one embodiment, the creating module 103 aggregates several TCP ACK frames into an A-MSDU packet according to the transmission time interval and the packet size value. For example, the transmission time interval is 15 milliseconds (ms). A TCP ACK frame is generated by 2~3 ms. Six TCP ACK frames are integrated as an A-MSDU packet by the creating module 103.

At block 210, the comparing module 104 compares the current data transmission speed with the first threshold value and the second threshold value.

At block 212, when the current data transmission speed is less than or equal to the first threshold value, it is determined whether timeout of the A-MSDU packet sent to the wireless access point continuously occurs over a first predefined time.

At block 214, when the timeout of the A-MSDU packet sent to the wireless access point continuously occurs over the first predefined time, the adjustment module 105 reduces the transmission time interval by the first preset value and re-calculates the packet size value according to the adjusted transmission time interval. In one embodiment, the first preset value is equal to the time for transmitting a maximum transmission unit (MTU).

For example, during the broadcast process of real-time TV by the terminal device 2, the data transmission rate is 5 Mbps, the MTU is 1500 bytes, the TCP ACK frame is 80 bytes, the first default value of the transmission time interval is 15 ms, and the second default value of the packet size value is 1600 bytes. When the comparing module 104 determines that the current data transmission speed is equal to the first threshold value, the adjustment module 105 reduces the transmission time interval by the first preset value, 1500 bytes/5 Mbps=2.3 ms, if the timeout of the A-MSDU packet sent to the wireless access point continuously occurs over the first predefined time. Thus, the adjustment of the transmission time interval is 15 ms−2.3 ms=12.7 ms, and the packet size value is re-calculated, according to the adjusted transmission time interval, and equal to 400 bytes, represented as 80*(12.7/2.3)=400 bytes.

At block 216, when the current data transmission speed is greater than or equal to the second threshold value, it is determined whether the size value of the created A-MSDU packet achieving the packet size value continuously occurs over a second predefined time.

At block 218, when the size value of the created A-MSDU packet achieving the packet size value occurs over the second predefined time, the adjustment module 105 increases the packet size value of the A-MSDU packet by the second preset value. In one embodiment, the second preset value is equal to the size of a TCP ACK frame.

When the terminal device 2, for example, downloads mass data, the data transmission rate is 40 Mbps, the MTU is 1500 bytes and the TCP ACK frame is 80 bytes, the first default value of the transmission time interval is 15 ms, and the second default value of the packet size value is 1600 bytes. When the comparing module 104 determines that the current data transmission speed is equal to the second threshold value, the adjustment module 105 increases the packet size value by the second preset value, 80 bytes if the size of the created A-MSDU packet achieving the packet size value occurs over the second predefined time. The adjusted packet size value is equal to 1680 bytes, represented as 1600 bytes+80 bytes=1680 bytes.

At block 220, when the current data transmission speed is greater than the first threshold value and less than the second threshold value, the adjustment module 105 sets the transmission time interval as the first default value and the packet size value as the second default value. That is to say, if the transmission time interval and the packet size value have been adjusted, the transmission time interval and the packet size value are recovered to the default values when the current data transmission speed is greater than the first threshold value and less than the second threshold value. When the current data transmission speed, for example, is greater than the first threshold value and less than the second threshold value, the adjusted transmission time interval, 12.7 ms, and the adjusted packet size value, 1680 bytes, are recovered to the default values, 15 ms and 1600 bytes.

At block 222, the transmission module 106 sends the A-MSDU packet to the wireless access point 4 according to the current transmission time interval and the packet size value. In one embodiment, when the previous transmission time interval of transmitting the A-MSDU packet to the wireless access point 4 is equal to the current transmission time interval or the size value of the created A-MSDU packet is equal to the packet size value, the created A-MSDU packet is transmitted to the wireless access point 4.

The embodiments shown and described above are only examples. Many details are often found in the art such as the other features of a terminal device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A packet processing method, executable by a processor of a server, the method comprising:
   setting a first default value of a transmission time interval, a second default value of a packet size value, a first threshold value of data transmission speed for Aggregate-MAC Service Data Unit (A-MSDU) packets and a second threshold value of data transmission speed for A-MSDU packets, wherein the first threshold value is less than the second threshold value;
   setting a first preset value for adjustment of the transmission time interval and a second preset value for adjustment of the packet size value;
   receiving transmission control protocol (TCP) packets from a wireless access point;
   creating an A-MSDU packet by aggregating TCP acknowledgement character (ACK) frames generated by the received TCP packets;
   comparing the current data transmission speed with the first threshold value and the second threshold value;
   when the current data transmission speed is less than or equal to the first threshold value and timeout for the A-MSDU packet sent to the wireless access point continuously occurs over a first predefined time, reducing the transmission time interval by the first preset value and re-calculating the packet size value according to the adjusted transmission time interval; and
   when the current data transmission speed is greater than or equal to the second threshold value and the size of the created A-MSDU packet that achieves the packet size value occurs over a second predefined time, increasing the packet size value by the second preset value.

2. The method as claimed in claim 1, further comprising:
when the current data transmission speed is greater than the first threshold value and less than the second threshold value, setting the transmission time interval as the first default value and the packet size value as the second default values.

3. The method as claimed in claim 1, further comprising:
determining whether the A-MSDU packet is send to the wireless access point according to the current transmission time interval and the packet size value of the data, wherein the A-MSDU packet is transmitted to the wireless access point as the passed time from transmitting the A-MSDU packet is equal to the current transmission time interval or the size of the A-MSDU packet is equal to the packet size value.

4. The method as claimed in claim 1, wherein the first preset value is equal to the time for transmitting a maximum transmission unit.

5. The method as claimed in claim 4, wherein the second preset value is the size of a TCP ACK frame.

6. A terminal device, which is connected to a wireless access point in a wireless manner, the terminal device comprising:
at least one processor;
a storage system; and
one or more programs that are stored in the storage system and executed by the at least one processor, the one or more programs comprising instructions for:
setting a first default value of a transmission time interval, a second default value of a packet size value, a first threshold value of data transmission speed for Aggregate-MAC Service Data Unit (A-MSDU) packets and a second threshold value of data transmission speed for A-MSDU packets, wherein the first threshold value is less than the second threshold value;
setting a first preset value for adjustment of the transmission time interval and a second preset value for adjustment of the packet size value;
receiving transmission control protocol (TCP) packets from a wireless access point;
creating an A-MSDU packet by aggregating TCP ACK frames generated by the received TCP packets;
comparing the current data transmission speed with the first threshold value and the second threshold value;
when the current data transmission speed is less than or equal to the first threshold value and timeout for the A-MSDU packet sent to the wireless access point continuously occurs over a first predefined time, reducing the transmission time interval by the first preset value and re-calculating the packet size value according to the adjusted transmission time interval; and
when the current data transmission speed is greater than or equal to the second threshold value and the size of the created A-MSDU packet that achieves the packet size value occurs over a second predefined time, increasing the packet size value by the second preset value.

7. The terminal device as claimed in claim 6, further comprising instructions for:
when the current data transmission speed is greater than the first threshold value and less than the second threshold value, setting the transmission time interval as the first default value and the packet size value as the second default values.

8. The terminal device as claimed in claim 6, wherein the terminal device further comprises instructions for:
determining whether the A-MSDU packet is send to the wireless access point according to the current transmission time interval and the packet size value of the data, wherein the A-MSDU packet is transmitted to the wireless access point as the passed time from transmitting the A-MSDU packet is equal to the current transmission time interval or the size of the A-MSDU packet is equal to the packet size value.

9. The terminal device as claimed in claim 6, wherein the first preset value is equal to the time for transmitting a maximum transmission unit.

10. The terminal device as claimed in claim 6, wherein the second preset value is the size of a TCP ACK frame.

* * * * *